US008855934B2

(12) United States Patent
Ozbek et al.

(10) Patent No.: US 8,855,934 B2
(45) Date of Patent: Oct. 7, 2014

(54) NOISE ATTENUATION OF SEISMIC DATA

(75) Inventors: Ali Ozbek, Milton (GB); Peter Forman, Horsted Keynes (GB)

(73) Assignee: WesternGeco L.L.C., Houston, TX (US)

( * ) Notice: Subject to any disclaimer, the term of this patent is extended or adjusted under 35 U.S.C. 154(b) by 545 days.

(21) Appl. No.: 12/933,500

(22) PCT Filed: Mar. 13, 2009

(86) PCT No.: PCT/GB2009/000676
§ 371 (c)(1),
(2), (4) Date: Nov. 22, 2010

(87) PCT Pub. No.: WO2009/118511
PCT Pub. Date: Oct. 1, 2009

(65) Prior Publication Data
US 2011/0060528 A1   Mar. 10, 2011

(30) Foreign Application Priority Data
Mar. 25, 2008   (GB) .................... 0805341.5

(51) Int. Cl.
*G01V 1/36*   (2006.01)
(52) U.S. Cl.
CPC ............ *G01V 1/364* (2013.01); *G01V 2210/32* (2013.01); *G01V 2210/3246* (2013.01)
USPC .............................................. 702/17; 367/45
(58) Field of Classification Search
CPC ........................................................ G01V 1/364
USPC ........................ 702/17, 14, 69, 77, 190, 191
See application file for complete search history.

(56) References Cited

U.S. PATENT DOCUMENTS

| 5,191,526 | A  | * | 3/1993  | Laster et al. ................... 702/17 |
| 5,586,026 | A  |   | 12/1996 | Highnam et al. |
| 5,594,439 | A  | * | 1/1997  | Swanson ..................... 341/118 |
| 6,173,011 | B1 | * | 1/2001  | Rey et al. ..................... 375/233 |
| 2007/0164856 | A1 | * | 7/2007 | Egner et al. ............. 340/539.13 |
| 2008/0091354 | A1 | * | 4/2008 | Byerly ............................. 702/6 |

FOREIGN PATENT DOCUMENTS

| WO | 9726559 A1    | 7/1997  |
| WO | 9960940 A1    | 12/1999 |
| WO | 2005017564 A1 | 2/2005  |

OTHER PUBLICATIONS

Fredrik Gustafsson, "Determining the Initial States in Forward-Backward Filtering", IEEE Transactions on Signal Processing, vol. 44, No. 4, Apr. 1996.*
Fletcher et al: "An initialization technique for improved MTI performance in phased array radars", Proceedings of the IEEE, Dec. 1972, pp. 1551-1552.
Gustafsson: "Determining the initial states in forward-backward filtering", IEEE Transactions on Signal Processing, vol. 44, No. 4, 1996, pp. 988-992.

(Continued)

*Primary Examiner* — Michael Nghiem
*Assistant Examiner* — Haidong Zhang

(57) ABSTRACT

The present invention relates to a method of filtering seismic data for noise attenuation. An embodiment of the present invention provides a method of processing seismic data in which the seismic data is transformed into an f-x domain using a discrete Fourier transform and is then filtered at each discrete frequency using an infinite impulse response (HR) filter.

20 Claims, 5 Drawing Sheets

(56) References Cited

OTHER PUBLICATIONS

Jenkerson et al: "Signal preserving swell noise attenuation using point receiver seismic data", 70th Annual International Meeting, Society of Exploration Geophysicists, Calgary, Aug. 6-11, 2000, Expanded Abstracts, pp. 2085-2087.

Likhterov et al: "Hardware-efficient technique for minimizing startup transients in Direct Form II digital filters", International Journal of Electronics, vol. 90, No. 7, 2003, pp. 471-479.

Peardon: "FK Techniques in seismic processing", Geophysical Signal Processing, Enders A. Robinson et al, Prentice-Hall, 1986, part III, chapter 11, pp. 388-467.

Presti et al: "A realizable paraunitary perfect reconstruction QMF bank based on IIR filters", Signal Processing, vol. 49, 1996, pp. 133-143.

Sadovsky et al: "Optimisation of the transient response of a digital filter", Radioengineering, vol. 9, No. 2, Jun. 2000, pp. 14-17.

Zhou et al: "Parallel Butterworth and Chebyshev dip filters with applications to 3-D seismic migration", Geophysics, vol. 64, No. 5, 1999, pp. 1573-1578.

Özbek: "Adaptive beamforming with generalized linear constraints", 70th Annual International Meeting, Society of Exploration Geophysicists, Calgary, Aug. 6-11 2000, pp. 2081-2084.

Combined Search and Examination Report of British Application No. GB 0805341.5 dated Jul. 25, 2008.

International Search Report of PCT Application No. PCT/GB2009/000676 dated Jul. 3, 2009.

* cited by examiner

NOISE ATTENUATION OF SEISMIC DATA

FIELD OF THE INVENTION

The present invention relates to a method of processing seismic data for noise attenuation.

BACKGROUND TO THE INVENTION

Seismic data are typically gathered using an array of detectors. In the case of marine data, hydrophones measure pressure fluctuations in the water caused by incoming seismic waves. Geophones measure vector quantities such as displacement, velocity or acceleration. In the case of marine data, a plurality of cables or streamers, which are spaced apart typically by about 100 meters, are towed behind a boat. Each cable has detectors spaced along the cable at intervals. In the case of land data, a geophone array is laid out on the ground with the geophones in an approximate grid formation. The detector array detects seismic signals from reverberations of a signal from a seismic source, such as an airgun for marine data. In ocean bottom (OBC or OBS) acquisition, a detector array is fixed on the seabed and the source may be an airgun mounted on a boat.

In seismic data processing, the data received by a receiver and then recorded are collectively called a trace. The collection of traces are stored for further processing to gain information about the earth's subsurface. Such information is commonly interpreted to detect the possible presence of hydrocarbons, or to monitor changes in hydrocarbon bearing rocks. The traces are initially recorded as shot gathers, where a plurality of traces, each from a different receiver, which are all data from a single shot. The distance between a seismic source and a receiver for a particular trace is known as the offset and the midpoint is a point midway between the source and receiver position, and represents the point from which the seismic energy is reflected if the reflectors are perfect flat reflectors. In a shot gather the traces are arranged in order of increasing offset. The traces can be sorted to form, for example, common receiver gathers or common midpoint gathers, as is appropriate for the particular processing technique being applied.

Seismic data in general contains coherent noise signals, along with seismic reflection signals. These noise signals, hereafter referred to as the noise, interfere with the interpretation of the seismic signals, and degrade the quality of the subsurface images that can be obtained by further processing. It is therefore desirable to suppress the noise that is present in the recorded data before processing it for imaging.

In land seismic, source generated noise like ground roll and airwaves are the dominant noise types, and can lead to severe degradation in data quality. In marine seismic, energy propagating as waves trapped in the water column and near surface layers is a significant source, as well as swell noise and bulge wave noise which result from waves propagating along the streamers of receiver devices. Other sources of coherent noise in marine seismic include passing vessels, other vessels acquiring seismic data in the vicinity, or any drilling activity close to the survey area. Swell noise in particular increases rapidly with heavy weather conditions. Furthermore, recent developments in acquisition have lead to an increase in swell noise. For instance, some recent developments in acquisition have employed streamer steering techniques to control the drift of streamers to maintain the streamers as close as possible to a straight line extending behind the boat and to maintain the plurality of streamers as close as possible to being parallel to each other. However, such streamer steering techniques result in an increase in swell noise.

During a marine towed streamer seismic survey, up to 45% of the production time may be spent turning the boat between lines. Data is usually not shot during turning or is rendered useless or of extremely low quality by high levels of streamer noise, which is caused by cross flow of the water. If quality data could be obtained from data shot during turns by processing techniques capable of removing this noise, then production efficiency could be greatly increased.

In seismic data processing, a common processing step is velocity (or dip) filtering, where wave field components faster than a given apparent velocity c are past, and the rest are rejected.

One method of implementing a velocity filter is as an f-k filter in the frequency-wavenumber domain. The filter is essentially a mask that is multiplied by a 2-D Fourier transform of the data. An example of an f-k filter is shown in FIG. 1. However, f-k filters suffer from edge effects and transients. (See, for example, Lloyd G. Peardon, F K *Techniques in Seismic Processing* in E. A. Robinson, T. S. Durrani with a Chapter by L. G. Peardon, *Geophysical Signal Processing*, pp. 388-467 (Prentice Hall Int'l 1986).

Another way of implementing a velocity filter is as a t-x filter, in the time-space domain using a 2D FIR (finite impulse response) filter. However, these also have a relatively slow transition from the pass to the reject regions, due to the finite length of the filter impulse response. As the filter gets larger, edge effects and computational costs can become significant. 2D IIR (infinite impulse response) filters can also be used in the time-space domain, but these have serious stability problems.

SUMMARY OF THE INVENTION

An embodiments of the present invention, provides a method of processing seismic data comprising:
    transforming the seismic data into an f-x domain using a discrete Fourier transform; and
    at each discrete frequency, applying an infinite impulse response (IIR) filter.

Thus, the embodiment of the present invention uses 1D IIR filters at each discrete frequency. IIR filters have long responses so that it is possible to design the IIR filters with a sharp transition from the pass band to the stop band. This can be especially useful near the origin in the f-k plane, where the noise with low frequency and low wave number content needs to be separated from the signal. The particular IIR filter chosen can be any of the standard types, including Butterworth, Chebyshev, etc.

Preferably, the method comprises applying each IIR filter spatially in a forward direction and backward direction.

IIR filters in general have non-linear phase responses and in order to achieve a zero phase response, the designed IIR filter is preferably implemented by first applying the filter to the data forward in space, and then applying the same filter backward in space. Such a procedure is called forward-backward filtering.

Preferably, the method comprises setting initial conditions for each IIR filter at the beginning of the data to minimise transients before applying the IIR filter in the forward direction. Preferably, the method also comprises setting the initial conditions for the IIR filter at the end of the data to minimise transients before applying the IIR filter in the backward direction.

Since IIR filters are recursive, they act on other output points, as well as the input data points. Thus, the sudden change of the input values at the beginning and the end of the data may give rise to significant levels of transients. Therefore, the method of the present invention involves setting the initial conditions of the filter to minimise transients.

In one embodiment, the method comprises assuming an input step function and setting filter coefficients such that the input and output functions of the filter are the same. Various approaches can be used to estimate the input step size. In one embodiment, the input step size is taken to be the first sample (for the forward pass of the filter) and the last sample (for the backward pass of the filter). In another embodiment, an initial noise attenuation is applied to the data and then the attenuated first sample is taken as the estimate of the input step size. Preferably, the noise attenuation is only applied to the first sample for the step function used to set the initial conditions on the forward pass of the filter and the step size used for setting the initial conditions at the end of the data is the last sample without the noise attenuation applied. The noise attenuation may be a low cut filter or spatial smoothing.

Preferably, the method comprises adding extrapolated data at the end of the data prior to application of the IIR filters and discarding the extrapolated data after application of the filters.

This padding of the back end of the data preserves signal that may be lost in forward-backward filtering and it is achieved by extrapolation of additional traces, for example by reflection with respect to the last sample. The phase delay due to the front to back filter will output signal beyond the original length of the input. This signal will be preserved in the extrapolated traces. Then, the application of the back to front filter will output this from the intermediate padded data back into the original length of the input. After both directions of the filter have been applied, the back end padding is discarded.

BRIEF DESCRIPTION OF THE DRAWINGS

Embodiments of the invention will now be described with reference to the accompanying drawings, in which.

DETAILED DESCRIPTION

Figure 1:
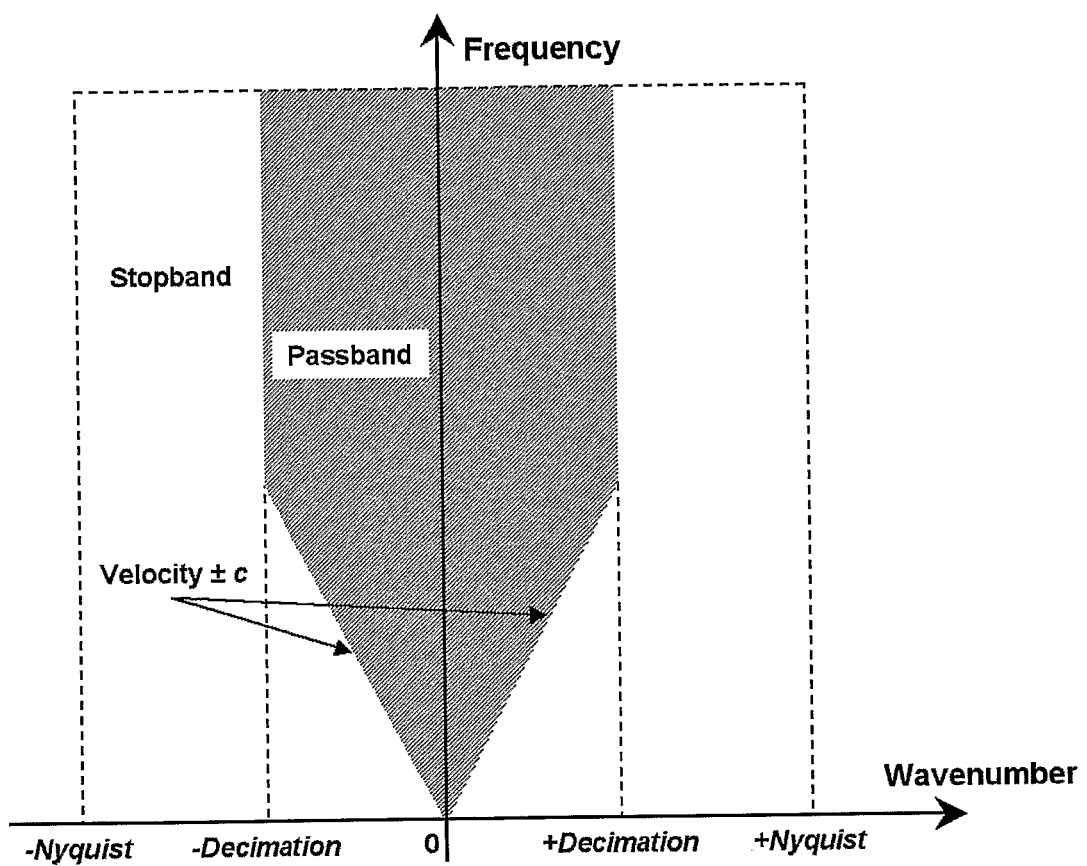
FIG. 1 shows a desired filter response in the f-k domain.

FIG. 1 illustrates the ideal response of a velocity (or dip) filter in the f-k domain. The filter comprises a tapered portion of velocity ±c and then a vertical cut-off at the decimation wavenumber, which is determined by the required output sampling interval (more precisely, it is given by 1/(2dx), where dx is the output sampling distance). To implement the f-k filter, a mask is multiplied by a 2D Fourier transform of the data.

Figure 2:
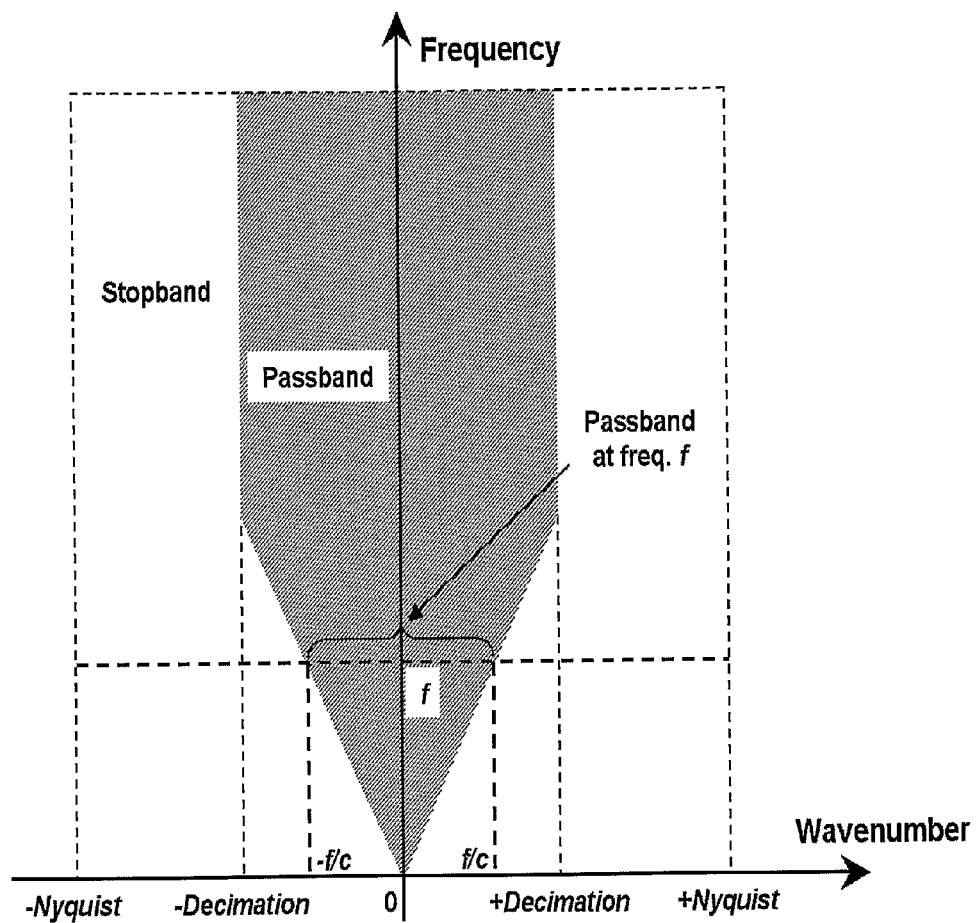
FIG. 2 illustrates the passband of the IIR filter in the present invention.

Therefore, in the present invention, a discrete Fourier transform of the data, which is recorded in the t-x domain, is taken to transform the data into an f-x domain. Then, at each discrete frequency, a one dimensional IIR filter is applied. This is illustrated in FIG. 2, which shows that the filter at frequency f will have a cut-off wavenumber of ±f/c up to a frequency given by (Velocity c)×(Decimation Wavenumber); beyond this frequency the filter will be a low-pass filter with a cut-off wavenumber of Decimation Wavenumber. Because IIR filters have a long response time, a sharp transition between the pass band and the stop band can be achieved. The particular IIR filter chosen can be any of the standard types, such as Butterworth, Chebyshev, etc.

In general, IIR filters have non-linear phase responses. To achieve a zero phase response, the designed IIR filter at each frequency is preferably implemented to first apply the filter to the data forward in space, and then to apply the same filter backward in space.

One problem with IIR filters is that, because they are recursive and act on other output points, as well as input data points, the sudden change of the input values at the beginning and the end of the data may give rise to significant levels of transients.

A preferred embodiment of the invention sets the initial conditions of the filter to minimise the effect of transients. The following describes one possible method of calculating the initial conditions for minimising the transients.

Suppressing the Transients of the IIR Filter

The nth output sample of an IIR filter of order N is given by the difference equation:

$$y(n) = \sum_{i=0}^{N} b_i x(n-i) - \sum_{i=1}^{N} a_i y(n-i), \quad (1)$$

where $a_i$ and $b_i$ are the coefficients of the non-recursive and recursive parts, respectively. The IIR filter can be implemented using various structures, including the Direct Form II transposed structure shown in FIG. 3.

Figure 3:
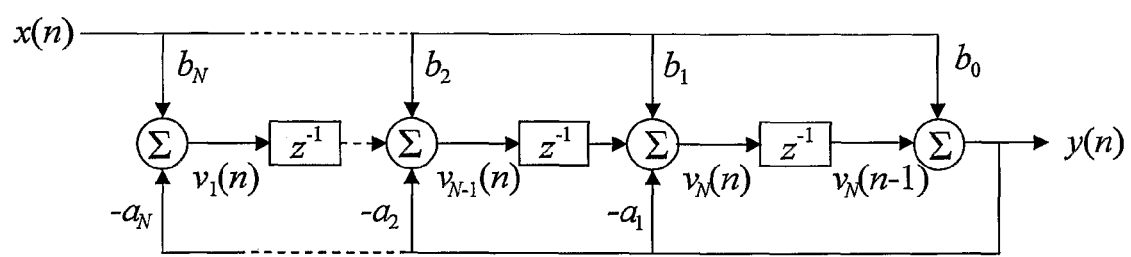
FIG. 3 illustrates a direct form infinite impulse filter structure.

In FIG. 3, the $v_i(n)$ are the values of the delay registers (also called internal, or state variables). The output of the filter, $y(n)$, can be thought of as being the sum of the homogeneous solution (sometimes called the zero-input solution), which is due to non-zero initial conditions, and the particular solution (sometimes called the zero-state solution), which is due to the external input $x(n)$.

The relationship between the input $x(n)$, the state variables $v_i(n)$, and the output $y(n)$ can be expressed through the state-space equations:

$$\begin{bmatrix} v_1(n) \\ v_2(n) \\ v_3(n) \\ \vdots \\ v_{N-1}(n) \\ v_N(n) \end{bmatrix} = \begin{bmatrix} 0 & 0 & 0 & \ldots & 0 & -a_N \\ 1 & 0 & 0 & \ldots & 0 & -a_{N-1} \\ 0 & 1 & 0 & \ldots & 0 & -a_{N-2} \\ \vdots & \vdots & \vdots & \ddots & \vdots & \vdots \\ 0 & 0 & 0 & \ldots & 0 & -a_2 \\ 0 & 0 & 0 & \ldots & 1 & -a_1 \end{bmatrix} \begin{bmatrix} v_1(n-1) \\ v_2(n-1) \\ v_3(n-1) \\ \vdots \\ v_{N-1}(n-1) \\ v_N(n-1) \end{bmatrix} + \begin{bmatrix} b_N - b_0 a_N \\ b_{N-1} - b_0 a_{N-1} \\ b_{N-2} - b_0 a_{N-2} \\ \vdots \\ b_2 - b_0 a_2 \\ b_1 - b_0 a_1 \end{bmatrix} x(n), \quad (2)$$

$$y(n) = \begin{bmatrix} 0 & 0 & 0 & \ldots & 0 & 1 \end{bmatrix} \begin{bmatrix} v_1(n-1) \\ v_2(n-1) \\ v_3(n-1) \\ \vdots \\ v_{N-1}(n-1) \\ v_N(n-1) \end{bmatrix} + b_0 x(n). \quad (3)$$

The unwanted transients are observed at the beginning of the record when IIR filters are applied from in the forward (front-to-back) direction, and at the end of the record when applied from in the backward (back-to-front) direction. This is mostly due to the step response of the filter, i.e. non-zero values at the beginning and end of the data.

Since we are free to choose the initial conditions of the filter as determined by the values of the delay registers, we can choose these to minimize the transients. Without loss of generality, we can assume that the input is a step function, i.e.:

$$x(n)=1, n=1, \ldots, N. \quad (4)$$

Of course, $x(n)=0$, $n \leq 0$ In response to this input, we want:

$$y(n)=1, n=1, \ldots, N. \quad (5)$$

The objective is to find $v_i(n)$, $n=1, \ldots, N$ such that this holds. Substituting (4) and (5) into the state-space equations (2) and (3), it can be shown that:

$$v_i(n)=v_i(n-1)=\ldots=v_i(n-N)\Box v_i, i=1, \ldots, N, \quad (6)$$

i.e., the internal variables must be constant throughout the initial transient ($n=1, 2, \ldots, N$).

Using (2)-(6), this implies that the internal variables $v_i$ can be found by solving the linear system of equations:

$$\begin{bmatrix} 1+a_1 & -1 & 0 & 0 & \ldots & 0 \\ a_2 & 1 & -1 & 0 & \ldots & 0 \\ a_3 & 0 & 1 & -1 & \ldots & 0 \\ \vdots & \vdots & \vdots & \vdots & \ddots & \vdots \\ a_{N-1} & 0 & 0 & 0 & \ldots & -1 \\ a_N & 0 & 0 & 0 & \ldots & 1 \end{bmatrix} \begin{bmatrix} v_N \\ v_{N-1} \\ v_{N-2} \\ \vdots \\ v_2 \\ v_1 \end{bmatrix} = \begin{bmatrix} b_1 - b_0 a_1 \\ b_2 - b_0 a_2 \\ b_3 - b_0 a_3 \\ \vdots \\ b_{N-1} - b_0 a_{N-1} \\ b_N - b_0 a_N \end{bmatrix}. \quad (7)$$

These equations were written for a unit step input; for a general input step size, the $v_i$ must be scaled accordingly. Various approaches can be used to estimate the input step size. The simplest would be to use the first sample. Another possibility is to first perform an initial noise attenuation on the data, and then take the first sample as the estimate of the input step size. The initial noise attenuation could for example be low-cut filtering if the noise is mostly in the low frequencies; or spatial smoothing, if the signal is mostly in low wavenumbers.

This method of setting the initial conditions for transient reduction is similar to the approach of Sadovský and Bartušek (Optimisation of the transient response of a digital filter, Radioengineering, 9(2): 14-17, 2000). Sadovský and Bartušek use the step size as the first sample, without any noise attenuation. Other approaches to achieve transient reduction could also be used, including that of Likhterov and Kopeika (Likhterov, B. and Kopeika, N., 2003, Hardware-efficient technique for minimizing startup transients in Direct Form II digital filters, Int. J. Electronics, 90(7), 471-479) and Gustafsson (Gustafsson, F., 1996, Determining the initial states in forward-backward filtering, IEEE Trans. Signal Processing, 46(4): 988-992) amongst others. Gustafsson, for example, sets the initial conditions by equalising the responses of the filter when applied forward-backward and backward-forward.

Figure 4:
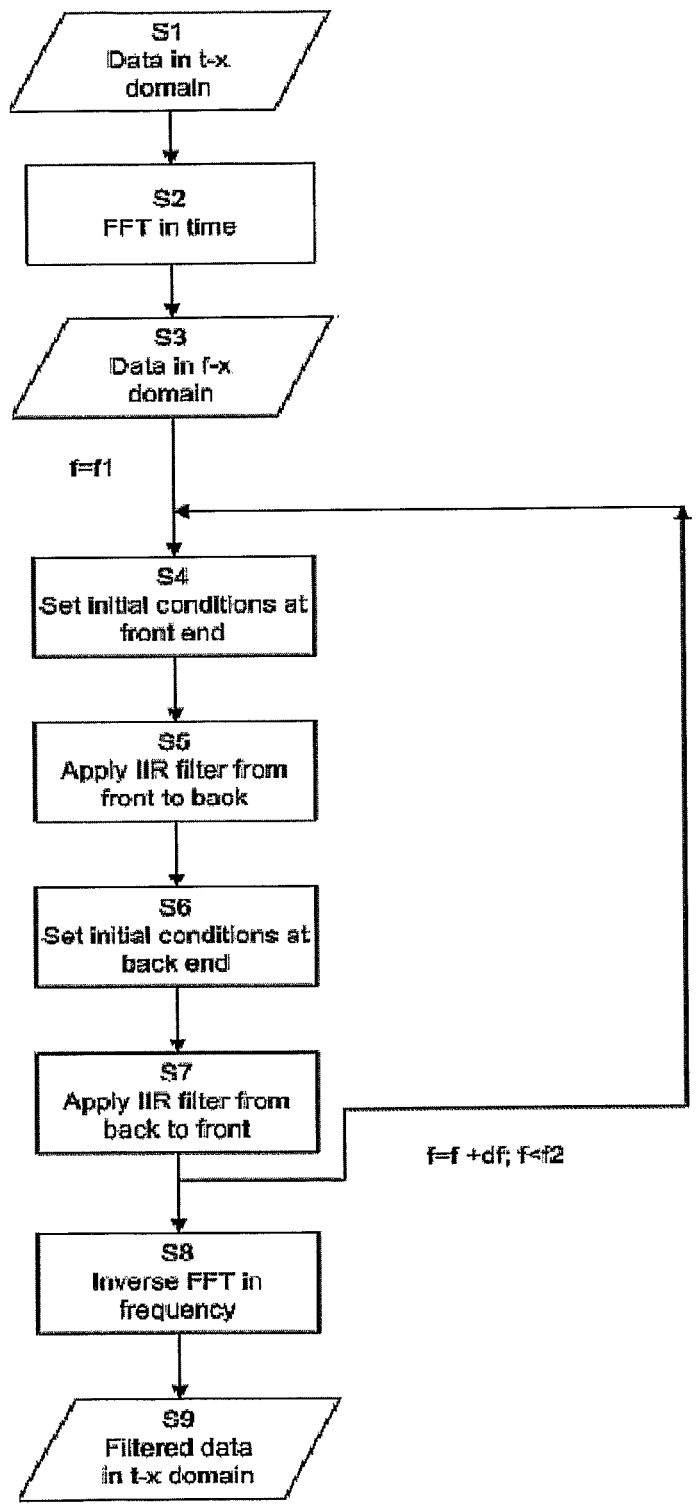
FIG. 4 is a flow chart of a method in accordance with an embodiment of the invention.

FIG. 4 is a flow diagram illustrating a method in accordance with a preferred embodiment of the present invention. At step S1, the data is input in the t-x domain. The data is typically in the form of shot gathers of traces, but may be common receiver gathers or common mid-point gathers.

In step S2 a discrete Fourier transform in time is applied to transform the data to the f-x domain at step S3. Then the data is selected at a first discrete frequency f1.

At step S4, the initial conditions at the front end of the data are set to minimise transients as described above. Specifically, a step function is taken, having a step side either equal to the first sample or the first sample with noise attenuation applied, and the filter coefficients are set such that the input and output functions of the filter as applied to the step function are the same.

In step S5, the 1D IIR filter having the coefficient determined in step S4 is applied in a forward direction to the data.

In step S6, the initial conditions at the back end of the data are determined. At the back end it is preferable to take the step function as being the last sample and to set the filter coefficients so that the input and output of the filter as applied to the step function are equal as described in more detail above. In step S7, the filter having the initial conditions determined in step S6 is applied to the data in a backwards direction.

Steps S4 to S7 are then repeated for the next discrete frequency until all of the frequencies have been filtered. In step S8, a reverse Fourier transform is applied to return the data to the t-x domain at step S9.

In a further embodiment of the invention, the back end of the data (high offsets) may be padded by adding additional traces. These traces may be obtained by extrapolating the data, for example by reflection with respect to the last sample. This prevents loss of signal due to the front to back filter outputting the signal beyond the original length of the input. This signal which is output beyond the original length of the data is output into the padded data and when the filter is applied in the reverse direction the signal is returned into the original length of the data. The back end padding is then discarded.

Figure 5:
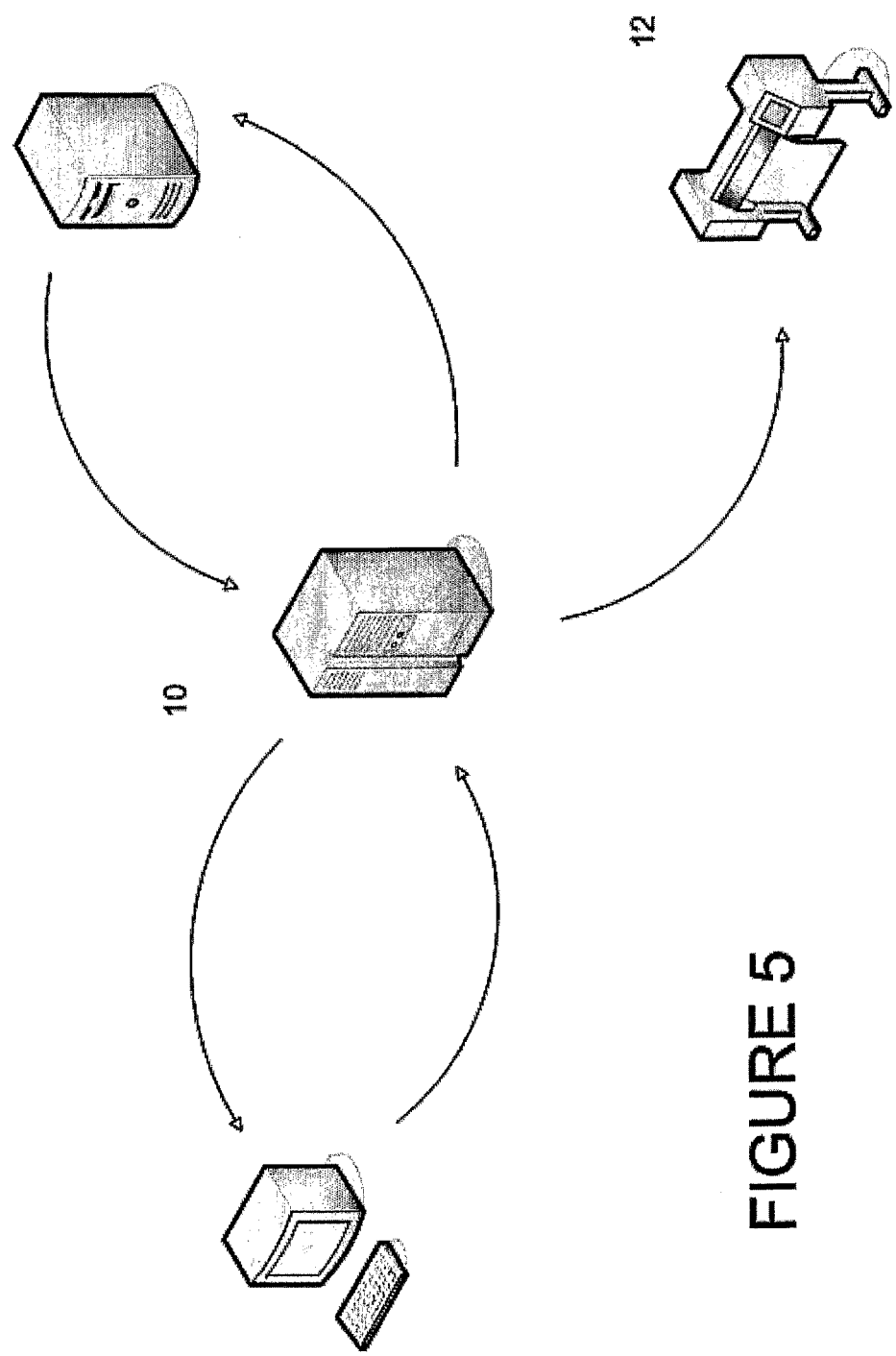
FIG. 5 shows a typical system for processing seismic data.

FIG. 5 illustrates a typical system for processing seismic data. Acquired seismic data is stored in a storage means 13, which may be a hard drive, tape or disk or any other form of data storage. A user terminal 11 is used by an operator to input parameters and instructions to build a suitable processing flow for data, which is submitted to a processor 10, which loads the appropriate data from the storage means 13 and carries out the processing steps in accordance with the user's instructions. The processor 10 then outputs processed data to the storage means 13 (or to a separate storage device). The processor may also send results to the user terminal 11, and/or a notification that the processing is complete. The processing means 10 may also send output data to a printer 12.

One example of a more detailed processing sequence in which the process of the present invention may be used is a process known as digital group forming. Digital group forming is a process in which responses from a large number of individual detectors are summed before digitizing and recording. Due to ultra fine detector spacing low frequency, low velocity noise loads (e.g. streamer noise) can be attenuated without the effects of aliasing, and without the need to apply low cut filters.

In the foregoing description, for the purposes of illustration, various methods and/or procedures were described in a particular order. It should be appreciated that in alternate embodiments, the methods and/or procedures may be performed in an order different than that described. It should also be appreciated that the methods described above may be performed by hardware components and/or may be embodied in sequences of machine-executable instructions, which may be used to cause a machine, such as a general-purpose or special-purpose processor or logic circuits programmed with the instructions, to perform the methods. These machine-executable instructions may be stored on one or more machine readable media, such as CD-ROMs or other type of optical disks, floppy diskettes, ROMs, RAMs, EPROMs, EEPROMs, magnetic or optical cards, flash memory, or other types of machine-readable media suitable for storing electronic instructions. Merely by way of example, some embodiments of the invention provide software programs, which may be executed on one or more computers, for performing the methods and/or procedures described above. In particular embodiments, for example, there may be a plurality of software components configured to execute on various hardware devices. Alternatively, the methods may be performed by a combination of hardware and software.

Hence, while detailed descriptions of one or more embodiments of the invention have been given above, various alternatives, modifications, and equivalents will be apparent to those skilled in the art without varying from the spirit of the invention. Moreover, except where clearly inappropriate or otherwise expressly noted, it should be assumed that the features, devices and/or components of different embodiments can be substituted and/or combined. Thus, the above description should not be taken as limiting the scope of the invention, which is defined by the appended claims.

The invention claimed is:

1. A method of processing seismic data comprising:
receiving the seismic data; and
using a processor to process the seismic data, wherein the processor comprises a non-transitory computer-readable medium comprising instructions that when executed by the processor cause the processor to perform that following method:
transforming the seismic data into an f-x domain using a discrete Fourier transform;
at each discrete frequency, applying an infinite impulse response (IIR) filter;
applying each IIR filter spatially in both a forward direction and a backward direction, wherein initial conditions are set for the IIR filter at the beginning of the data to minimize transients before applying the IIR filter in the forward direction;
assuming an input step function and setting filter coefficients such that the input and output functions of the filter are the same, wherein at least one of a first sample is used as the step size of the step function for setting the initial conditions at the beginning of the data and a last sample is used as the step size of the step function for setting the initial conditions at the end of the data, and wherein:
a noise attenuation method is applied to the first sample;
the noise attenuation is only applied to the first sample;
the attenuated first sample is used as the step size of the step function for setting the initial conditions at the beginning of the data; and
the step size used for setting the initial conditions at the end of the data is the last sample.

2. A method according to claim 1, further comprising setting the initial conditions for the IIR filter at the end of the data to minimize transients before applying the IIR filter in the backward direction.

3. A method according to claim 1, wherein the noise attenuation is a low cut filter.

4. A method according to claim 1, wherein the noise attenuation is spatial smoothing.

5. A method according to claim 1, further comprising adding extrapolated data at the end of the data prior to application of the IIR filters.

6. A method according to claim 5, wherein the extrapolated data is obtained by reflection with respect to the end of the data.

7. A method according to claim 5, wherein the extrapolated data is discarded after application of the filters.

8. A method according to claim 1, wherein each IIR filter comprises a low pass filter with a cut-off wavenumber comprising a Decimation Wavenumber.

9. A method according to claim 1, wherein the data is transformed from a t-x domain to the f-x domain by application of a Fourier transform in time.

10. A method according to claim 9, wherein the data is transformed back to the t-x domain after filtering by application of an inverse Fourier transform.

11. A method according to claim 1, wherein the seismic data comprises a plurality of traces representing seismic energy received as a function of time at a plurality of locations.

12. A method according to claim 11, wherein the traces are arranged in order of increasing distance from a seismic source.

13. A method according to claim 11, wherein the locations are regularly spaced apart in the x direction.

14. A method according to claim 11, comprising adding extrapolated traces at the end of the plurality of traces, being the furthest distance from the seismic source, prior to application of the IIR filters.

15. A method according to claim 14, further comprising discarding the extrapolated traces after the application of the filters.

16. A method of seismic surveying comprising:
propagating an acoustic or electromagnetic field through at least one subsurface layer of the earth;
acquiring data at a plurality of discrete locations; and
processing the data according to claim 1.

17. The method of claim 1, further comprising:
determining one or more parameters relating to physical properties of the earth's interior from the processed seismic data.

18. An apparatus for processing seismic data comprising:
means for transforming the seismic data into an f-x domain using a discrete Fourier transform and configured to apply an infinite impulse response (IIR) filter at each discrete frequency, wherein each IIR filter is applied spatially in both a forward direction and a backward direction;
means for setting initial conditions for the IIR filter at the beginning of the data to minimize transients before applying the IIR filter in the forward direction, wherein:
the means for setting initial conditions sets the initial conditions for the IIR filter at the end of the data to minimize transients before applying the IIR filter in the backward direction;

the means for setting initial conditions assumes an input step function and setting filter coefficients such that the input and output functions of the filter are the same;

a first sample is used as the step size of the step function for setting the initial conditions at the beginning of the data or a last sample as the step size of the step function for setting the initial conditions at the end of the data; and means for applying a noise attenuation method to the first or last sample, wherein the noise attenuation method is only applied to the first sample and the means for setting initial conditions uses the attenuated first sample as the step size of the step function for setting the initial conditions at the beginning of the data and uses the last sample as the step size for setting the initial conditions at the end of the data.

19. An apparatus according to claim 18, further comprising extrapolation means for adding extrapolated data at the end of the data prior to application of the IIR filters.

20. An apparatus according to claim 19, wherein the extrapolation means obtains the extrapolated data by reflection with respect to the end of the data.

\* \* \* \* \*